United States Patent [19]

McCord

[11] Patent Number: 4,615,768

[45] Date of Patent: Oct. 7, 1986

[54] VAPOR GENERATING AND RECOVERY APPARATUS INCLUDING CONTINUOUS CONVEYING MEANS THROUGH A VAPOR ZONE

[76] Inventor: James W. McCord, 9101 Nottingham Pkwy., Louisville, Ky. 40222

[21] Appl. No.: 730,506

[22] Filed: May 6, 1985

Related U.S. Application Data

[63] Continuation-in-part of Ser. No. 581,544, Feb. 21, 1984.

[51] Int. Cl.$^4$ .............................................. B01D 3/00
[52] U.S. Cl. ........................... 202/170; 202/185 E; 202/186; 202/234; 134/12; 134/109; 203/98; 203/100; 203/DIG. 4; 203/DIG. 16; 432/28
[58] Field of Search ............... 202/170, 185.6, 185.3, 202/186, 161, 234; 203/DIG. 16, 88, DIG. 4, 26, 87, 98, 100; 134/12, 31, 32, 11, 10, 15, 37, 104–109, 64 R, 122 R; 432/28; 228/34, 36

[56] References Cited

U.S. PATENT DOCUMENTS

| 2,976,224 | 3/1961 | Gilliland | 203/100 |
|---|---|---|---|
| 3,015,576 | 1/1962 | Hendrixson et al. | 202/170 |
| 3,032,482 | 5/1962 | Shoemaker | 203/100 |
| 3,227,629 | 1/1966 | Kearney et al. | 202/170 |
| 3,866,307 | 2/1975 | Pfahl et al. | 228/249 |
| 3,904,102 | 9/1975 | Chu et al. | 134/31 |
| 3,947,240 | 3/1976 | Pfahl | 432/28 |
| 4,014,751 | 3/1977 | McCord | 202/170 |
| 4,389,797 | 6/1983 | Spigarelli et al. | 34/73 |

Primary Examiner—Wilbur Bascomb
Attorney, Agent, or Firm—Charles G. Lamb

[57] ABSTRACT

An apparatus for vaporizing a liquid and condensing the vapor includes at least one chamber in which the liquid is vaporized and at least one chamber in which the vapor is condensed. The apparatus has a conveyor inlet channel preferably at one end of the vaporizing chamber, and a conveyor outlet channel preferably at the opposite end of the vaporizing chamber. A conveyor for moving items to be treated through the apparatus extends through the conveyor inlet channel into the vaporizing chamber and out of the vaporizing chamber through the conveyor outlet channel. The apparatus includes a heat emitting device in the vaporizing chamber providing a surface temperature above the vaporizing temperature for substantially instantaneously vaporizing the liquid condensate maintaining a predetermined vapor level in the vaporizing chamber, and a cooling device in the condensate chamber for condensing the vapor.

20 Claims, 5 Drawing Figures

VAPOR GENERATING AND RECOVERY APPARATUS INCLUDING CONTINUOUS CONVEYING MEANS THROUGH A VAPOR ZONE

This application is a continuation-in-part of patent application Ser. No. 581,544 filed Feb. 21, 1984.

BACKGROUND OF THE INVENTION

1. Field of the Invention

This invention relates to a vapor generating and recovering apparatus for vaporizing a liquid and recovering the vapor, and more particularly to a vapor generating and recovery apparatus providing for continuously moving items to be treated therethrough and recovering virtually all of the generated vapor.

2. Description of the Prior Art

Vapor generating and recovery apparatuses are well known for surface treating objects. The surface treating can be a cleaning treatment wherein foreign material, such as, for example, oil or wax is removed from the surface of the objects, or a heat emitting treatment for shrink fitting or a heat absorbing treatment for reflowing metals. Regardless of the exact nature of the surface treatment, the objects to be surface treated are, typically, immersed into an appropriate treating vapor, and the vapor is recovered for reuse in the treating process.

Examples of such apparatuses are shown in U.S. Pat. Nos. 3,866,307 issued on Feb. 18, 1975 to Pfahl Jr., et. al. and 4,389,797 issued on June 28, 1983 to Spegarelli, et. al. Each of these patents show an apparatus for soldering circuit boards by passing the circuit boards through a hot vapor. The apparatus includes a vessel having heating coils located near the vessel floor. The heating coils are immersed in a liquid to be vaporized and heat the liquid to a temperature at or above its vaporizing temperature.

One example of a heretofore known apparatus is taught in U.S. Pat. No. 3,947,240 issued on Mar. 30, 1976. The apparatus is for generating a vapor for soldering, fusing or brazing articles. The apparatus includes an open topped vessel having a heating coil in the portion end and cooling coils between the top and bottom of the vessel. A eutectic solder heated by the heating coil forms a molten pool over the bottom of the vessel. A liquid to be vaporized forms a pool floating or forming a stratified layer of liquid on top of the molten pool of eutectic solder. The liquid is brought to and maintained at a boil by the heat of the molten solder which acts as a heat transfer medium between the heating coil and the liquid.

In some instances, objects to be surface treated are at a substantially lower temperature than the temperature of the vaporized liquid. When these relatively cold objects are immersed in the vapor, the objects can initially and rapidly absorb enough heat from the treatment vapor to condense this vapor to a liquid. When this happens, the vapor zone collapses. The time required to vaporize the liquid is lost to the treatment process thereby extending the time required to complete the treatment operation. This lost time increases costs, particularly when the treatment process is a step in a high volume manufacturing operation.

SUMMARY OF THE INVENTION

The present invention is directed to a vapor generating and recovery apparatus which provides for the continuous movement of objects to be treated through the apparatus and the substantially instantaneous vaporization of an object treating liquid therein.

The present invention is further directed to a vapor generating and recovery apparatus for receiving a conveyor therethrough with means to recover substantially all of the vapor generated in the operation of the apparatus.

More particularly, the present invention provides a vapor generating and recovery apparatus comprising means defining at least one vaporizing chamber in which a liquid is instantaneously vaporized; a thermal mass disposed within the at least one vaporizing chamber; heating means for heating the thermal mass such that at least the top surface of the thermal mass is at a temperature above the vaporizing temperature of the liquid to be vaporized sufficient to vaporize any of the liquid coming in contact with the top surface of the thermal mass to create a zone of vapor above the thermal mass; means defining at least one condensing chamber adjacent to the vaporizing chamber in which the vapor is condensed; cooling means located in the condensing chamber for cooling the vapor to a temperature below the vaporizing temperature; at least one opening in the housing providing conveyor inlet and outlet means; conveyor means extending through the conveyor inlet into the vaporizing chamber, across the vaporizing chamber, and out of the vaporizing chamber through the conveyor outlet; and means defining a path of vapor communication from the vaporizing chamber to the condensing chamber at an elevation above the conveyor means.

BRIEF DESCRIPTION OF THE DRAWINGS

A better understanding of the present invention will be had upon reference to the following description in conjunction with the drawings wherein like numerals refer to like parts and in which.

DETAILED DESCRIPTION

Figure 1:
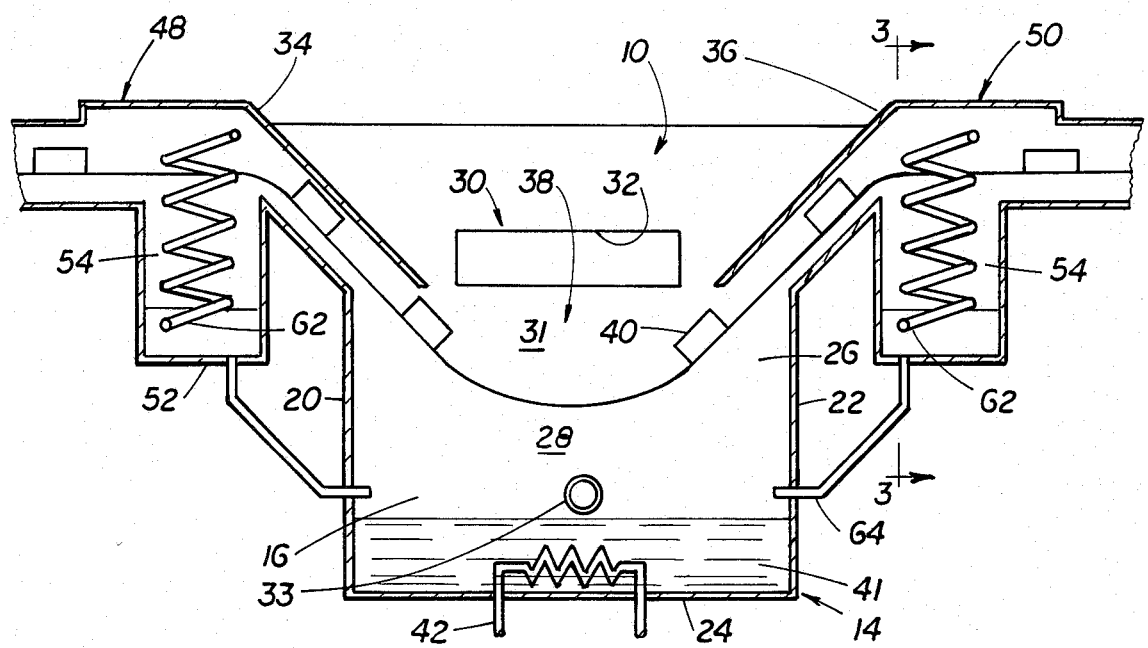
FIG. 1 is a side view in schematic representation partially broken away, of an advantageous embodiment of a vapor generating and recovery apparatus of the present invention.
Figure 2:
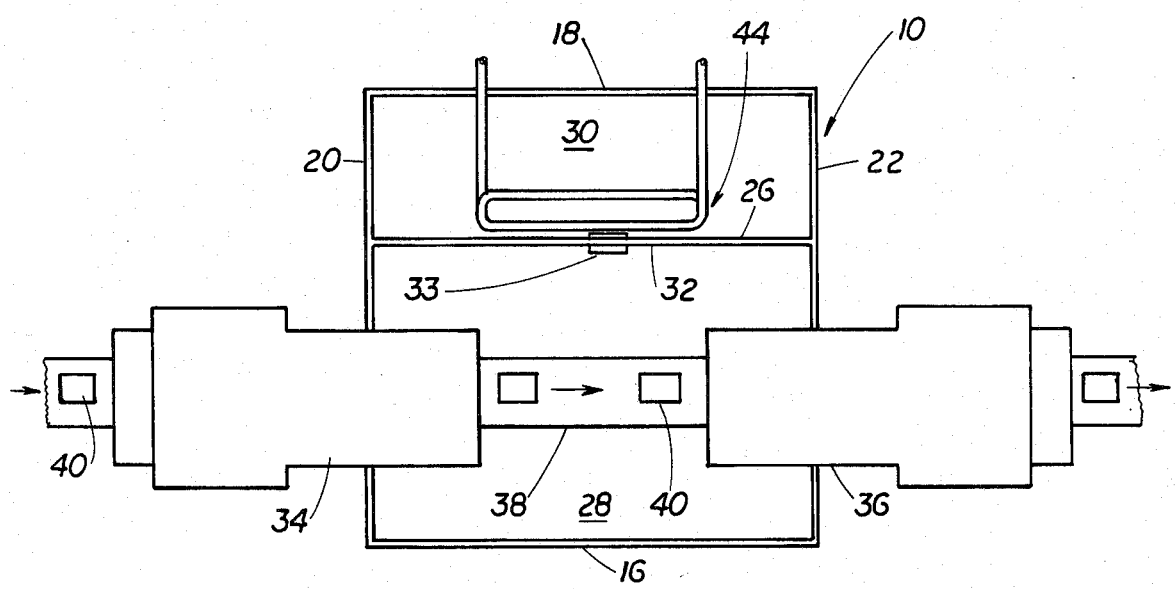
FIG. 2 is a top view of the apparatus of FIG. 1.

With reference to FIGS. 1 and 2, there is shown a vapor generating and recovery apparatus, generally denoted as the number 10, for maintaining a treating composition in a vaporized state. The apparatus 10 can be used, for example, for cleaning objects of oil, grease, wax or particulate matter, or for heat treating an object for shock testing or metal reflow. The examples, however, are only given by way of illustrating some end uses of the apparatus and are not to be considered in any way as limitations of the present invention. The apparatus 10 has virtually endless applications, and the composition of the treating vapor will, of course, depend upon a particular end use.

The vapor generating and recovery apparatus 10 includes a housing 14 having spaced apart side walls 16 and 18, spaced apart end walls 20 and 22, and a floor 24. A partition wall 26 spans the distance between the end walls 20 and 22 dividing the interior of the housing 10 into at least one vaporizing chamber 28 wherein a treating composition is maintained in a vaporized state in a vapor zone 31 and at least one condensing chamber 30 wherein the generated vapor 31 is condensed. A path of vapor communication from the vaporizing chamber 28 to the condensing chamber 30 is defined by means of, for example, an aperture 32 formed in the partition wall 26. The aperture 32 is located at the upper level of the vapor zone 31 in the vaporizing chamber 28 and functions in the manner of a weir for the flow of vapor from the vaporizing chamber into the condensing chamber 30. A condensate return means, such as a short conduit or opening 33 in a wall 26 produces condensate flow communication between the condensing chamber 30 and vaporizing chamber 28. The housing 10 also includes conveyor inlet means illustrated as a channel or tunnel 34 located at one end of and open to the vaporizing channel 28, and conveyor outlet channel means illustrated as a channel or tunnel 36 located at the opposite end of and open to the vaporizing chamber 28. As shown, the inlet and outlet tunnels 34 and 36 are formed by closed ducts which extend into the vaporizing chamber 28.

Conveying means, such as, for example, an endless belt conveyor device 38 extends through the conveyor inlet tunnel 34 into the vaporizing chamber 28, across the vaporizing chamber 28, and out of the vaporizing chamber 28 through the conveyor outlet tunnel 36. The portion of the conveyor device 38 extending across the vaporizing chamber 28 is disposed at an elevation below the vapor aperture 32 in the partition 26 and, therefore, below the upper level of the vapor zone 31 in the vaporizing chamber 28. The conveyor device 38 is used to continuously move objects 40 through the vaporizing chamber 28 wherein they are surface treated by the vapor 31.

A liquid thermal mass 41 is disposed within the vaporizing chamber 28 and forms a pool to a predetermined depth covering the floor 24 of the vaporizing chamber 28. The liquid thermal mass can be, for example, a eutectic metal having a eutectic point, i.e., its lowest melting temperature, lower than the vaporizing temperature of the liquid to be vaporized. Other liquid thermal masses, for example, include silicone oils, vegetable oils, mineral oils, and the like.

The apparatus 10 further includes heat emitting means 42 located in the vaporizing chamber 28 below the top surface of the thermal mass 41 for heating the thermal mass 41 to a temperature above the vaporizing temperature of the heating liquid to create the vapor zone 31 above the top surface of the thermal mass 41, and cooling means 44 located in the condensing chamber 30 for cooling the vapor to a temperature below the vaporizing temperature to cause the vapor to condense in the condensing chamber 30. As shown, the heat emitting means 42 comprises at least one heat emitting coil located above the housing floor 24 in the chamber 28 and immersed in the thermal mass 41. As illustrated, the cooling means 44 comprises at least one heat absorbing coil located just below the vapor aperture 32 in the condensing chamber 30. The heat emitting coil 42 and heat absorbing coil 44 can be of virtually any type such as, for example, the heat emitting coil 42 can be an electrically heated coil and the heat absorbing coil 44 can be a water cooled coil. However, it is preferred that the heat emitting coil 42 be a refrigerant condensing coil, and the heat absorbing coil 44 be a refrigerant evaporating coil of a refrigerant system 46, hereinafter discussed.

Figure 3:
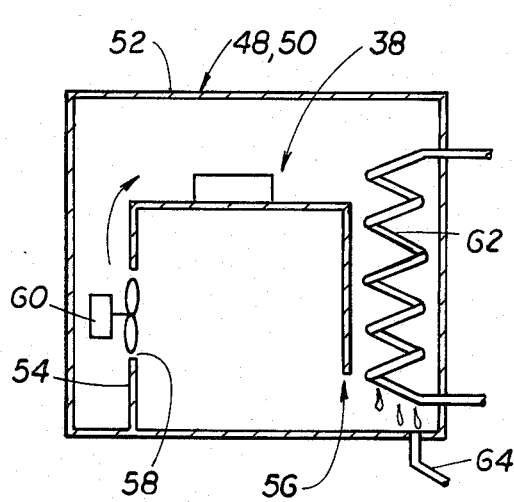
FIG. 3 is an enlarged view of a portion of the apparatus of FIG. 1 as viewed in the direction of arrows 3—3 in FIG. 1.

With reference to FIGS. 1, 2 and 3, in order to prevent vapor from migrating out of the vaporizing chamber 28 through the conveyor inlet and outlet tunnels 34 and 36, thereby resulting in the loss of liquid and contamination of the ambient atmosphere, a vapor trap means may be provided at one of the openings in the housing for receiving the conveyor device. In a preferred apparatus, vapor trap means are provided at both the conveyor inlet and outlet. In the preferred apparatus, a first vapor trap 48 is provided at the conveyor inlet tunnel 34, and a second vapor trap 50 is provided at the conveyor outlet tunnel 36. With respect to the direction of travel of the conveyor device 38, the first vapor trap 48 is located upstream of the conveyor inlet tunnel 34, and the second vapor trap 50 is located downstream of the conveyor outlet tunnel 36. The vapor traps 48 and 50 are substantially identical, and, therefore, for the sake of brevity, only the first vapor trap 48 will be described, it being understood that the description applies equally to the second vapor trap 50. As can be best seen in FIG. 3, the vapor trap 48 comprises an outer compartment 52 open to the conveyor inlet tunnel 34, through which the conveyor 38 traverses, and an inner compartment 54 located within the outer compartment 52 below the path of the conveyor 38 through the outer compartment 52. Vapor or fluid recovery is provided for through the inner compartment 54 and outer compartment 52 by means of, for example, a first aperture 56 formed in the inner compartment 54 defining means to provide fluid flow communication between the inner compartment and outer compartment, and a second aperture 58 in the inner compartment 54 defining means at the opposite side of the inner compartment from the first aperture 56 to provide fluid flow communication between the inner compartment and outer compartment. Fluid circulates across the outer compartment 52, through the first aperture 56, across the inner compartment 54 and through the second aperture 58 by, for example, a fan 60 located at, for example, the second aperture 58. The vapor trap 48 further includes cooling means 62 located in the outer compartment 52 for condensing the vapor entrained in the gas stream circulated by the fan 60. The cooling means 62 cools the vapor to a temperature below its vaporizing temperature causing it to condense in the outer compartment 52. The condensate is returned to the vaporizing chamber 26 from the outer compartment 52 of the vapor trap 48 by means of, for example, a conduit 64 having its open inlet end at the bottom region of the outer compartment 52 and its open outlet end in the vaporizing compartment 26. The cooling means 62 comprises at least one heat absorbing coil located at the first aperture 56 in the inner compartment 54, and it can be of virtually any type, such as, for example, a water cooled coil. However, preferably, the cooling means 62 is a refrigerant evaporator coil of a refrigerant evaporator coil of a refrigerant system 46 hereinafter described.

Figure 4:
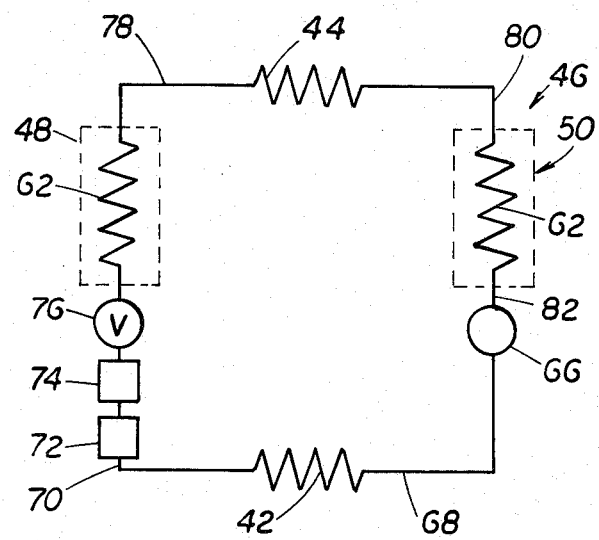
FIG. 4 is a schematic of the refrigeration system for the apparatus of the present invention.

With reference to FIG. 4, there is shown in schematic, an example of the refrigerant system 46. The exemplary refrigerant system 46 is illustrated as comprising a refrigerant compressor 66 for compressing a suitable refrigerant. The high pressure side of the refrigerant compressor 66 is in refrigerant flow communication with the refrigerant condensing coil 42 (heat emitting means) through a refrigerant gas conduit 68. The refrigerant evaporator coil 62 of the first evaporator trap 48 is located downstream of the refrigerant condensing coil 42 and is in refrigerant flow communication with the refrigerant condensing coil 42 through conduit 70. A conventional refrigerant receiver 72, dryer 74 and appropriate thermal expansion valve 76 are also operatively disposed in the conduit 70 between the refrigerant condensing coil 42 and the refrigerant evaporator coil 62. The refrigerant evaporator coil 44 of the cooling means is located downstream of the refrigerant evaporator coil 62 of the first vapor trap 48 and is in refrigerant flow communication with the refrigerant evaporator coil 62 through a refrigerant conduit 78. The refrigerant evaporator coil 62 of the second evaporator coil 44 and is in refrigerant flow communication with the refrigerant evaporator coil 44 through conduit 80. The outlet of refrigerant evaporator coil 62 of the second evaporator trap 50 is in refrigerant flow communication with the low pressure side of the compressor 66 to complete the refrigerant circuit.

Figure 5:
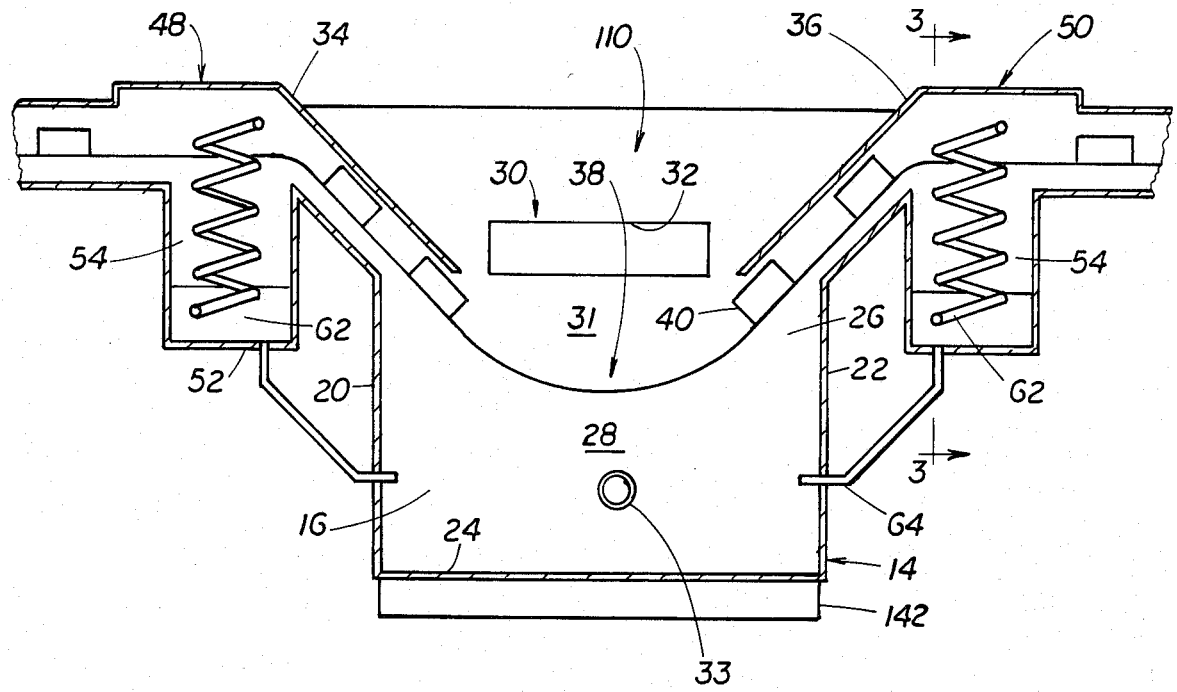
FIG. 5 is a schematic side view representation, partially broken away, of another advantageous embodiment of a vapor generating and recovery apparatus of the present invention.

FIG. 5 illustrates another advantageous embodiment of a vapor generating and recovery apparatus, generally denoted as the numeral 110 of the present invention, wherein the many features in common with the apparatus 10 of FIG. 1 are denoted by the same numerals. The apparatus 110 includes heating means 142 such as an electrical resistance heater located beneath and in contact with the housing floor 24. The heat energy generated by the heating means 142 is transferred to the housing floor 24 and is sufficient to heat the housing floor 24 to a temperature above the vaporizing temperature of the liquid. Therefore, the housing floor functions as a thermal mass.

The foregoing detailed description is given primarily for clearness of understanding and no unnecessary limitations are to be understood therefrom for modifications will become obvious to those skilled in the art upon reading this disclosure and may be made without department from the spirit of the invention or scope of the appended claims.

What is claimed is:

1. A vapor generating and recovery apparatus comprising:
    means defining at least one vaporizing chamber in which a liquid is vaporized;
    a thermal mass disposed within the at least one vaporizing chamber;
    heat emitting means for heating the thermal mass such that the top surface of the thermal mass will be at a temperature higher than the vapor temperature of the liquid to be vaporized, sufficient to substantially instantaneously vaporize any of said liquid coming in contact with the thermal mass;
    means defining at least one condensing chamber separate from the vaporizing chamber and laterally adjacent to the vaporizing chamber in which the vapor is condensed;
    cooling means located in the condensing chamber for cooling the vapor to a temperature below the vaporizing temperature;
    at least one opening in the apparatus providing conveyor inlet and outlet means;
    conveyor means extending through the conveyor inlet into the vaporizing chamber, across the vaporizing chamber, and out of the vaporizing chamber through the conveyor outlet; and
    means defining a path of vapor communication from the vaporizing chamber to the condensing chamber, the vapor path communication defining means being located laterally to one side of the portion of the conveyor means extending through the vaporizing chamber for moving the vapors in the vaporizing chamber away from said conveyor inlet and outlet means and away from the conveyor means in a direction generally laterally of the portion of the conveyor means extending through the vaporizing chamber and from the vaporizing chamber into the condensing chamber.

2. The apparatus of claim 1 further comprising a vapor trap means disposed at said at least one opening.

3. The apparatus of claim 2 wherein the vapor trap means comprises:
    means defining an outer compartment having openings therein for receiving conveyor means therethrough and through which the conveyor means traverses;
    means defining an inner compartment within the outer compartment;
    means providing for fluid circulation through the inner and outer compartments; and,
    cooling means disposed within the trap means for condensing the fluid flowing out of the vaporizing chamber.

4. The apparatus of claim 3 wherein the cooling means of the vapor trap means is located in the outer compartment.

5. The apparatus of claim 3 wherein the means providing for fluid circulation through the inner and outer compartments of the vapor trap means comprises:
    a first aperture in the inner compartment defining means providing flow communication between the inner and outer compartments;
    a second aperture in the inner compartment defining means at the opposite side of the inner compartment from the first aperture providing flow communication between the inner and outer compartments; and,
    means for moving fluid across the outer compartment, through the first aperture, across the inner compartment, and through the second aperture.

6. The apparatus of claim 5 wherein the fluid moving means of the vapor trap means comprises fan means.

7. The apparatus of claim 3, wherein:
    the heat emitting means comprises at least one refrigerant condensing coil of a refrigerant system;
    the cooling means of the vapor trap means comprises at least one refrigerant evaporator coil of the refrigerant system; and,
    the cooling means in the condensing chamber comprises at least one refrigerant evaporator coil of the refrigerant system.

8. The apparatus of claim 1, further comprising:
    first vapor trap means located upstream of the conveyor inlet means for capturing vapor flowing out of the vaporizing chamber through the conveyor inlet means; and
    second trap means located downstream of the conveyor outlet means for capturing and condensing vapor flowing out of the vaporizing chamber through the conveyor outlet means.

9. The apparatus of claim 8, further comprising:
    means for returning condensate from the first trap means to the vaporizing chamber; and, means for returning condensate from the second trap means to the vaporizing chamber.

10. The apparatus of claim 1, wherein the vapor path defining means comprises weir means located at the upper level of the vapor zone in the vaporizing chamber.

11. The apparatus of claim 1, wherein the cooling means in the condensing chamber is located below the vapor path defining means.

12. The apparatus of claim 1 further comprising means for circulating condensate from the condensing chamber to the vaporizing chamber.

13. The apparatus of claim 1, wherein:
the heat emitting means comprises at least one refrigerant condensing coil of a refrigerant system; and
the cooling means comprises at least one refrigerant evaporator coil of a refrigerant system.

14. The apparatus of claim 1, wherein the at least one condensing chamber includes an opening disposed substantially equi-distance between the conveyor inlet means and the conveyor outlet means.

15. The apparatus of claim 1, wherein the at least one opening in the housing includes a tunnel through which said conveyor passes.

16. The apparatus of claim 1, wherein the means defining a path of vapor communication from the vaporizing chamber to the condensing chamber includes an opening in said condensing chamber spaced from said at least one opening in the housing whereby vapors to be condensed are drawn away from said at least one opening in the housing.

17. The vapor generating and recovery apparatus of claim 1, wherein the thermal mass is a liquid having a higher vaporizing temperature than the vaporizing temperature of the liquid to be vaporized.

18. The vapor generating and recovery apparatus of claim 17, wherein the thermal mass is a metal.

19. The vapor generating and recovery apparatus of claim 17, wherein the thermal mass is an oil.

20. The vapor generating and recovery apparatus of claim 1, wherein:
the heat emitting means is located immedately beneath and next to a floor of the vaporizing chamber for heating the vaporizing chamber floor to a temperature above the vaporizing temperature of the liquid to be vaporized.

* * * * *